United States Patent
Ryall

(10) Patent No.: US 6,382,841 B1
(45) Date of Patent: May 7, 2002

(54) OPTICAL COMPONENT COUPLING AND METHOD FOR MANUFACTURING SAME

(75) Inventor: Richard J. Ryall, Sonoma, CA (US)

(73) Assignee: Optical Coating Laboratory, Santa Rosa, CA (US)

( * ) Notice: Subject to any disclaimer, the term of this patent is extended or adjusted under 35 U.S.C. 154(b) by 0 days.

(21) Appl. No.: 09/536,814

(22) Filed: Mar. 28, 2000

(51) Int. Cl.$^7$ .................................................. G02B 6/38
(52) U.S. Cl. ............................................ 385/61; 385/33
(58) Field of Search ............................ 385/61, 115, 24, 385/34, 49, 88–94, 99, 33; 430/536, 538

(56) References Cited

U.S. PATENT DOCUMENTS

| | | | |
|---|---|---|---|
| 5,099,399 A | 3/1992 | Miller et al. | 362/32 |
| 5,317,655 A | 5/1994 | Pan | 385/11 |
| 5,359,688 A | 10/1994 | Underwood | 385/70 |
| 5,375,181 A | 12/1994 | Miller et al. | 385/27 |
| 5,430,574 A | 7/1995 | Tehrani | 359/378 |
| 5,487,123 A | 1/1996 | Fowble | 385/70 |
| 5,530,940 A | 6/1996 | Ludwig, Jr. et al. | 385/31 |
| 5,692,078 A | 11/1997 | Le Febre | 385/53 |
| 5,692,081 A | 11/1997 | Takahashi | 385/78 |
| 5,802,227 A | 9/1998 | Dunn et al. | 385/53 |
| 5,845,023 A | 12/1998 | Lee | 385/33 |
| 6,222,970 B1 * | 4/2001 | Wach et al. | 385/115 |
| 6,246,813 B1 * | 6/2001 | Zheng | 385/34 |

OTHER PUBLICATIONS

Haruo Takahashi, "*Temperature Stability of Thin–Film Narrow–Bandpass Filters Produced by Ion–Assisted Deposition*," Applied Optics, vol. 34, No. 4, Feb. 1, 1995 pp. 667–675.

Ed Miskovic, "*Wavelength Lockers Keep Lasers in Line*," Reprinted from the Feb. 1999 issue of Photonics Spectra, Laurin Publishing Co., Inc.

\* cited by examiner

*Primary Examiner*—Phan T. H. Palmer
(74) *Attorney, Agent, or Firm*—Workman Nydegger Seeley

(57) ABSTRACT

The present invention discloses a bonding collar for coupling optical components and methods for manufacturing the bonding collar and mounting the optical components to the bonding collar. The bonding collar is composed of a material having a thermal expansion coefficient comparable to that of the coupled optical components and is formed by a first socket into one end of a cylindrical blank and a square second socket in communication with the first socket so that when a GRIN lens is inserted in the first socket and a filter is placed in the second socket, the GRIN lens and filter will directly contact each other. Further, the manufacturing process ensures alignment between the two sockets. The filter and GRIN lens are bonded to the bonding collar by applying adhesive to the visible interfaces that the bonding collar forms with the GRIN lens and the filter.

54 Claims, 10 Drawing Sheets

OPTICAL COMPONENT COUPLING AND METHOD FOR MANUFACTURING SAME

BACKGROUND OF THE INVENTION

1. The Field of the Invention

The present invention relates generally to methods and devices for coupling and mounting optical components. More particularly, embodiments of the present invention relate to an improved device, as well as to its manufacture and use, for coupling fiber optic components in such a way as to ensure adjacent contact between the coupled components and thus facilitate high levels of thermal stability in the completed optical assembly.

2. The Prior State of the Art

Traditionally, data and signal transmission has been accomplished by sending a series of electronic pulses along one or more metallic wires or cables to a receiver, which then converts the pulses into a usable form. Within a limited range, metallic wires and cables are generally effective as a signal and data-carrying medium. However, metallic wires suffer from a variety of shortcomings which serve to limit their effectiveness as a transmission medium.

First, all metallic wires and cables are characterized by imperfections such as chemical impurities. These imperfections cause the electronic pulses to lose energy, or attenuate, as the pulse travels down the wire. As a result, signal regenerators are required at various points along the wire to electrically boost the electronic pulses and thus effect transmission of a signal and/or data.

Second, the amount of information that a metallic wire or cable is capable of carrying, i.e., the bandwidth of the wire, is constrained by limitations inherent in the wire. In particular, bandwidth is sharply limited by factors including, but not limited to, the size and composition of the transmission wire.

The bandwidth limitations inherent in metallic wire has become increasingly problematic as the existing wire networks of telephone companies are called upon to transport increasing amounts of voice and data signals—especially with the proliferation of the Internet. Moreover, wires and cables take up a great deal of space in already crowded wireways and trunks, and are difficult to work with and install. They are also susceptible to electromagnetic interference, voltage surges, and similar types of electronic noise. Thus, there has been an increasing need for alternative forms of technology to meet data and signal transmission needs.

One increasingly popular approach is to utilize fiber optic technology. Essentially, fiber optic technology employs optical waveguides made of glass, plastic or the like, as a means for transmission of data and/or signals in the form of light pulses. Typically, optical waveguides take the form of optical fibers. There are a number of advantages in using fiber optics as a data and signal transmission medium: fiber optics were relatively lighter in size and weight as compared to metallic transmission media—some experts have estimated that it would take 33 tons of copper to transmit the same amount of information handled by 4 ounces of optical fiber; optical fibers were not susceptible to electromagnetic interference and voltage surges; optical fibers were less prone to signal attenuation; and, perhaps most importantly, optical fibers possessed a tremendous bandwidth.

As a result of the numerous advantages associated with the use of fiber optic technology as a means for data and signal transmission, fiber optics are being used in an ever-increasing number of applications, including local area networks (LANs) and a variety of communications systems. Also, the ascendancy of the Internet has served to emphasize the need for a transmission medium capable of transmitting large amounts of data over great distances both rapidly and reliably. Fiber optic technology is well suited to serve this end because of its large bandwidth capabilities, high data transmission speeds—up to 1600 times faster than conventional copper wires, and relatively low signal attenuation characteristics.

Many examples of the implementation of fiber optic technology can be found in the telecommunications industry. Some examples of widely used fiber optic arrangements include wavelength division multiplexing (WDM) devices, and gain-flattening devices.

Clearly, fiber optic technology represents a significant advance in the field of data and signal transmission. However, despite the numerous advantages of fiber optic technology and the continuous advances being made, there are still a variety of problems in the field that are as yet unresolved. As indicated in the following discussion, one of the major unresolved problems in the fiber optics field is the thermal instability of many fiber optic assemblies.

In general, thermal instability refers to the inability of an optical assembly to consistently perform in accordance with a desired set of specifications when exposed to a particular range of temperatures. For example, an optical assembly that performs in accordance with the desired specifications at room temperature will often be 'out of spec' at elevated operating temperatures. Specifically, relatively high operating temperatures cause the various components in typical optical assemblies to change their orientation and/or position with respect to each other. Because the precise positioning and alignment of the optical components is critical to the effective performance of an optical assembly, any movement or shifting of the individual optical components compromises the performance of the optical assembly as a whole. The problem of thermal instability is particularly acute in the area of micro-optics where interference filters, for example, are generally as small as 4 $mm^2$, or less, in cross-sectional area.

Though thermal instability can be thought of in terms of relative spatial movements or shifts of optical components in an optical assembly, practitioners in the art have found it convenient to express thermal instability in a more precise fashion. Specifically, it is generally acknowledged that thermal stability may be described in terms of the shift of the center wavelength (CWL) of the passband as a function of temperature; wherein the CWI shift is expressed in units of picometer/°C., or pm/°C., and 'passband' refers to a range of wavelengths desired to be transmitted, or passed, through a given interference filter. As an example, the CWL of a known 50 GHz filter is about 1.1 pm/°C. over an operating range of 0–80° C.

Thermal instability in optical assemblies very often stems from the manner in which the individual optical components are assembled and/or held in place. A typical optical assembly employs one or more gradient index (GRIN) lenses, one or more optical fibers, and at least one interference filter. Often, these components are attached to each other in a face-to-face configuration and retained in place by means of epoxy or other adhesives applied to the respective faces. The adhesive typically has an index of refraction substantially the same as the attached optical components. In other cases, the optical components are retained in a spaced-apart configuration by means of adhesive in combination with some type of structural mount.

In operation, transmitted light travels down the optical fiber to the GRIN lens, which then collimates the transmitted light. The collimated light is thus refocused by the GRIN lens for transmission through another optical fiber. Typically, an interference filter is attached to, or near, the GRIN lens so as to transmit and/or reflect only selected wavelengths of the collimated light leaving the GRIN lens.

Although widely used, the known assembly methods and mounting structures for optical components contribute significantly to the thermal instability of optical assemblies. One feature of known mounting methods that is particularly problematic is the application of adhesives or the like to the faces of optical components so as to fasten optical components together in a face-to-face configuration. The problems arising from such methods are cause for concern in any optical assembly, but are of particular concern where the method is used to attach a thin film interference filter to a GRIN lens—a common arrangement in both transmissive and reflective fiber optic devices.

One objective in optical design is to minimize the number of non-essential components in the optical path because non-essential components can distort, impede, and disrupt light transmission. Obviously, introduction of adhesive between optical components is at cross purposes with this objective. Adhesives are not essential to performance in the sense that they have some desired effect on the transmitted light, rather, they simply serve to hold optical assemblies together. Use of adhesives with indices of refraction matched to those of the joined optical components is simply an attempt to minimize the negative effects of the adhesive.

Another major problem with the use of adhesives and the like in the optical path concerns the rate of thermal expansion of the adhesives. In particular, the adhesives commonly used to join optical components in face-to-face configurations generally have thermal expansion rates many times greater than the thermal expansion rates of the joined optical components. The practical effect of this differential in thermal expansion rates is that, when exposed to elevated operating temperatures, the adhesive expands further and more quickly than the optical components on either side of it. Thus, the optical components are moved and shifted by the rapidly expanding adhesive. As previously noted, movement and shifting of optical components, relative to each other, degrades the performance of the optical assembly. Furthermore, if the adhesive is not applied uniformly to the joined components, as is often the case in the typical manually assembled optical device, the expansion of the adhesive will be non-uniform as well; that is, some portions of the adhesive may expand a greater distance than others, thereby causing the joined optical components to tilt and move out of alignment with each other. Obviously, non-uniform and uncontrolled expansion of the adhesive is an undesirable result given the critical importance of positioning and alignment of optical components in optical assemblies. Note that the problems caused by introduction of adhesive in the optical path become particularly acute where the joined optical surfaces are not flat, e.g., where one surface is convex and one is concave.

Other known optical assemblies do not use adhesives on the faces of joined optical components, rather, adhesive is applied to the edges of the optical components so as to facilitate attachment of the components to a mount. However, practical considerations make this approach problematic as well.

In particular, the edges of the optical components form an interface, or contact area, between the optical component and the mount. Further, the optical components also form a contact area with each other where they touch; it is inherent in the geometry of such an arrangement that this face-to-face contact area is coterminous with the contact areas formed between the respective optical components and the mount. Accordingly, when adhesive is applied to the edges of optical components, so as to secure those components to the mount, the adhesive tends to wick by capillary action into the face-to-face contact area. In other arrangements, the two optical components are brought into face-to-face contact, and adhesive is applied around the periphery of the contact area. However, wicking of the adhesive commonly occurs when this assembly method is used. Specifically, the adhesive moves by capillary action from the periphery of the contact area into the contact area itself, and thus into the optical path. For at least the reasons previously discussed, it is highly undesirable to have adhesives or other non-essential components in the optical path.

Use of adhesives on or near the faces of joined optical components is problematic for other reasons as well. For example, in the event of an amplifier overload, such as might be experienced in the context of communications system operations, the adhesive in the optical path could fail and render the optical system inoperative.

Finally, any adhesive used to join the faces of optical components must be able to transmit light in the wavelength range of interest. Accordingly, there is a limited universe of adhesives from which to select—such specialized adhesives necessarily add to the cost of optical assemblies.

Some attempts have been made to resolve the problems realized when adhesive is introduced into the optical path. In one approach, the optical components are made relatively long, so that adhesive applied to the edges of the components that are in contact with the mount is less likely to wick into the contact area between the joined optical components. While somewhat effective in reducing the wicking problem, this approach has the drawback that relatively large areas of the components are unconstrained by adhesive and are thus free to move in response to changes in operating temperature. As noted earlier, movement of the optical components has a substantial and undesirable effect on the performance of the optical assembly.

At least one other attempt has been made to foreclose the problem of adhesive wicking into the optical path. The typical solution has been to interpose a gap or gaps between the optical components in an optical assembly. The optical components are then joined to a mount by means of adhesive applied to the edges of the components. Since the optical components do not contact each other in these arrangements, there is little danger of adhesive wicking into the optical path. However, these types of arrangements create another set of problems.

A major shortcoming of spaced-apart arrangements wherein gaps are introduced between the optical components is that the gaps have a detrimental effect on optical performance. As previously noted, it is generally acknowledged that optimum optical performance is achieved when the optical components are in direct contact with each other. When the components are spaced apart, transmitted light can reflect off the surfaces of the optical components; this is an undesirable result because the reflected light tends to disrupt light transmission and thus degrade the performance of the optical assembly. Further, reflection off the optical surfaces also causes interference fringes which act to disrupt and degrade light transmission.

Finally, one other significant problem associated with spaced apart arrangements of fiber optic components in an optical assembly is that because the optical components are not in direct contact, it is difficult to ensure that, in the final assembly, the optical components are properly aligned with respect to each other, i.e., not tilted. The already difficult task of aligning components in these types of assemblies, particularly where micro-optics are concerned, is further exacerbated by the fact that these optical assemblies are typically assembled by hand. Manual assembly techniques introduce an element of inconsistency where the arrangement and orientation of the optical components are concerned.

In view of the foregoing problems with the known methods and devices used to couple fiber optic components, what is needed is an improved bonding device and a mounting method for mounting optical components in the bonding device that will ensure stable performance of fiber optic assemblies over a wide range of operating temperatures. Specifically, the improved bonding device should be configured to facilitate a variety of physical arrangements between optical components, and should be able to accommodate optical components having a variety of sizes and cross-sectional shapes. Additionally, the improved bonding device should ensure alignment between optical components when the components are fully seated in the coupling. Further, the improved bonding device should be configured to prevent wicking of bonding agents into the face-to-face contact area between the coupled optical components. Also, the bonding device should be composed of a material having thermal properties similar to those of the coupled optical components so as to minimize the adverse effects of non-uniform expansion of the optical assembly.

With regard to mounting of the optical components in the bonding device, the improved method should be useful with a variety of bonding media so as to permit optimization of the thermal and mechanical characteristics of the optical assembly. Further, the improved mounting method should ensure that the bonding device exerts a force on the mounted optical components which will tend to maintain contact, or other desired orientations, between the components when the assembly is heated to operating temperatures. Also, the improved mounting method should overcome any tendency of the adhesive to separate the optical components during the mounting process. Finally, the improved mounting method should be readily automated.

SUMMARY AND OBJECTS OF VARIOUS EMBODIMENTS OF THE INVENTION

The present invention has been developed in response to the current state of the art, and in particular, in response to these and other problems and needs that have not been fully or completely solved by currently available fiber optic component mounting methods and couplings. Thus, it is an overall object of the present invention to provide an improved bonding collar and mounting method, utilizing the bonding collar, that are particularly useful for joining fiber optic components. It is another object of the invention to provide a bonding collar that introduces a space between the areas where the respective optical components are bonded to the bonding collar, so as to prevent adhesive from wicking into the face-to-face contact area between the optical components. It is yet another object of the invention to provide a bonding collar that is capable of coupling substantially round GRIN lenses with substantially square thin film interference filters, as well as being adapted to receive optical components of disparate sizes. A further object of the invention is to provide a bonding collar having a coefficient of thermal expansion that falls within a predetermined range.

It is another object of the present invention to provide an improved optical component mounting method that is effective with a variety of bonding agents, including solder, adhesives and the like. It is a further object of the present invention to provide a mounting method that helps ensure that the desired positions of the optical components are properly maintained during the curing of the bonding agents.

Finally, it is an object of the present invention to provide a mounting method that helps ensure that the optical components in the optical assembly produced by the inventive mounting method will maintain their positions when the optical assembly is exposed to thermal variations during operation.

In summary, embodiments of the present invention are directed to an improved bonding collar and mounting method, utilizing the bonding collar, for use in coupling fiber optic components. Presently preferred embodiments are particularly suitable for use in micro-optic systems where it is desired to join thin film interference filters to GRIN lenses. Typically, the optical assemblies thus formed find particular application in a variety of communications systems, including telephone systems, and computer network applications.

In a preferred embodiment, the bonding collar is composed of a material or combination of materials with thermal properties similar to those of the GRIN lens and filter. Preferably, the bonding collar material is 416 SS, 303 SS, or the like. In a preferred embodiment, the bonding collar is formed by drilling a concentric first socket partway into one end of a cylindrical blank and then cutting four slots in the other end of the cylindrical blank, wherein the slots are perpendicular to the end of the cylindrical blank and each intersects the first socket, so that upon cutting the fourth slot, a waste portion of material drops out, leaving a square second socket in communication with the concentric first socket.

In presently preferred embodiments, the bonding collar is preferably used to couple a thin film interference filter having an approximately 4 mm$^2$ face with a GRIN lens approximately 1.8 mm in diameter. In one embodiment, the GRIN lens is received in the concentric first socket so as to form a first contact area between the GRIN lens and the bonding collar, and the filter is received in the square second socket so as to form a second contact area between the filter and the bonding collar. Also, the GRIN lens and filter are preferably in a face-to-face contact orientation, so as to form a third contact area, when each is fully received in the bonding collar. In a preferred embodiment, the bonding collar is configured so as to ensure that the third contact area is noncoterminous with respect to the first and second contact areas. By thus separating the first and second contact areas from the third contact area, the space serves to prevent transportation of adhesive, via capillary action, from the first contact area between the GRIN lens and the bonding collar to the third contact area of the GRIN lens and filter. The space also serves the same function with respect to the second contact area between the filter and the bonding collar.

Preferably, the GRIN lens is bonded to the bonding collar with a bonding agent, adhesive, or the like. For example, the adhesive is applied so as to be equally spaced around the visible interface between the GRIN lens and the bonding collar after the GRIN lens has been cleaned and inserted into the bonding collar. In a preferred embodiment, a plurality of bonding collars are arranged in a fixture, which comprises a plurality of pins or the like adapted to fit into the respective square sockets of the bonding collars. The plurality of bonding collars are placed onto the pins and oriented with their respective concentric holes facing upwards so as to receive the respective plurality of GRIN lenses. Preferably, the fixturing of the collars, insertion of the GRIN lenses, and subsequent application of the adhesive are automated. The GRIN lens—bonding collar subassemblies thus formed are placed in an oven or the like for curing of the adhesive. In one illustrative embodiment, the adhesive is cured for about 10 minutes at a temperature of about 110° C., then the GRIN lens—bonding collar subassemblies are removed from the oven and allowed to cool.

In a preferred embodiment, the plurality of completed GRIN lens—bonding collar subassemblies are then fixtured in a filter bonding jig comprising a plurality of holes, the holes being slightly larger in diameter than the GRIN lenses so as to securely receive the plurality of the GRIN lenses, the respective square sockets of the plurality of bonding collars facing upwards. A thin film interference filter is then placed in each of the bonding collars so that the film side of the filter completely contacts the upward facing surface of the GRIN lens. In a preferred embodiment, the respective contacting surfaces of the GRIN lens and the filter are complementary planar surfaces. Adhesive can be applied to the visible interfaces between the top of the bonding collar and the sides of the filter. In a preferred embodiment, a weight centering sleeve is then lowered over each of the filter—GRIN lens assemblies. For example, a shaft with a weight at one end and a plastic pad at the other is inserted into the weight centering sleeve until the plastic pad contacts the filter, the plastic pad serving to hold the filter securely against the face of the GRIN lens.

Preferably, the assemblies thus formed are then cured in an oven or the like. In one presently preferred embodiment, the curing process comprises the steps of: i) curing the assemblies for about 10 minutes at about 110° C., then removing the assemblies and allowing them to cool; ii) removing the weights, sleeves, and bonded assemblies from the filter bonding jig and placing the bonded assemblies in a curing fixture, the curing fixture then being placed in an oven so as to further cure the bonded assemblies— preferably, this curing step comprises curing at about 75° C. to about 85° C. for about 1 hour; and, iii) removing the curing fixture from the oven and placing the curing fixture in another oven to cure at about 105° C. to about 115° C. for about 1 hour, and then removing the bonded assemblies and allowing them to cool. In a preferred embodiment, the mounting method described herein results in a CWL shift of the optical assembly, during operation, of about 0.1 pm/°C. to about 0.25 pm/°C.

These and other objects, features, and advantages of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention and its presently understood best mode for making and using the same will be described and explained with additional specificity and detail through the use of the accompanying drawings in which.

DETAILED DESCRIPTION OF THE PREFERRED EMBODIMENTS

Reference will now be made to figures wherein like structures will be provided with like reference designations. It is to be understood that the drawings are diagrammatic and schematic representations of presently preferred embodiments of the invention, and are not to be construed as limiting the present invention, nor are the drawings necessarily drawn to scale.

In general, the present invention relates to a bonding collar, a method for manufacturing the same, and a method for mounting optical components in the bonding collar. The bonding collar and mounting method are for use in constructing transmissive and/or reflective fiber optic and optic waveguide assemblies such as might be used in telecommunications systems, computer networks and the like. FIGS. 1 through 6j indicate various presently preferred embodiments of the bonding collar, bonding collar manufacturing method, and optical component mounting method conforming to the teachings of the invention.

Figure 1:
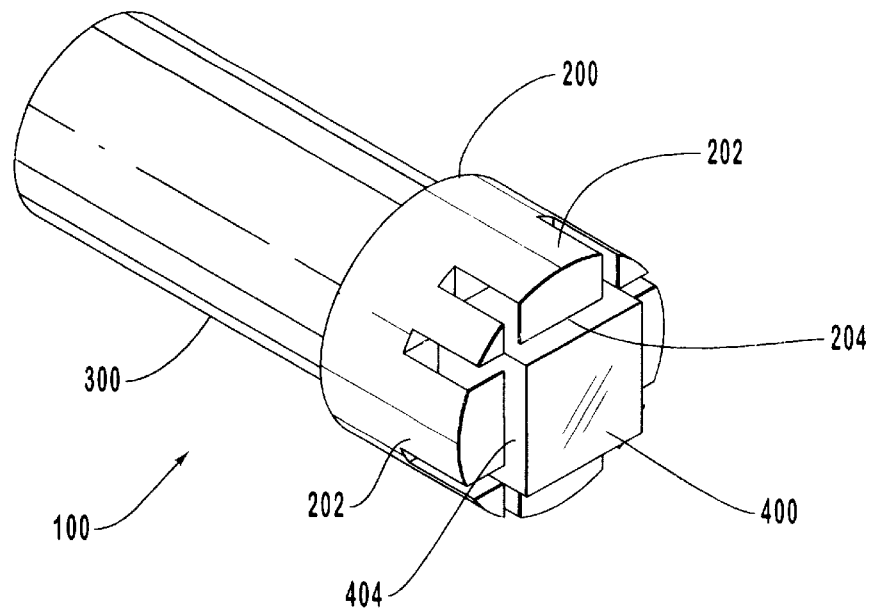
FIG. 1 is a perspective view of a preferred embodiment of the bonding collar showing the orientation of a GRIN lens and a thin film interference filter in the bonding collar.
Figure 2:
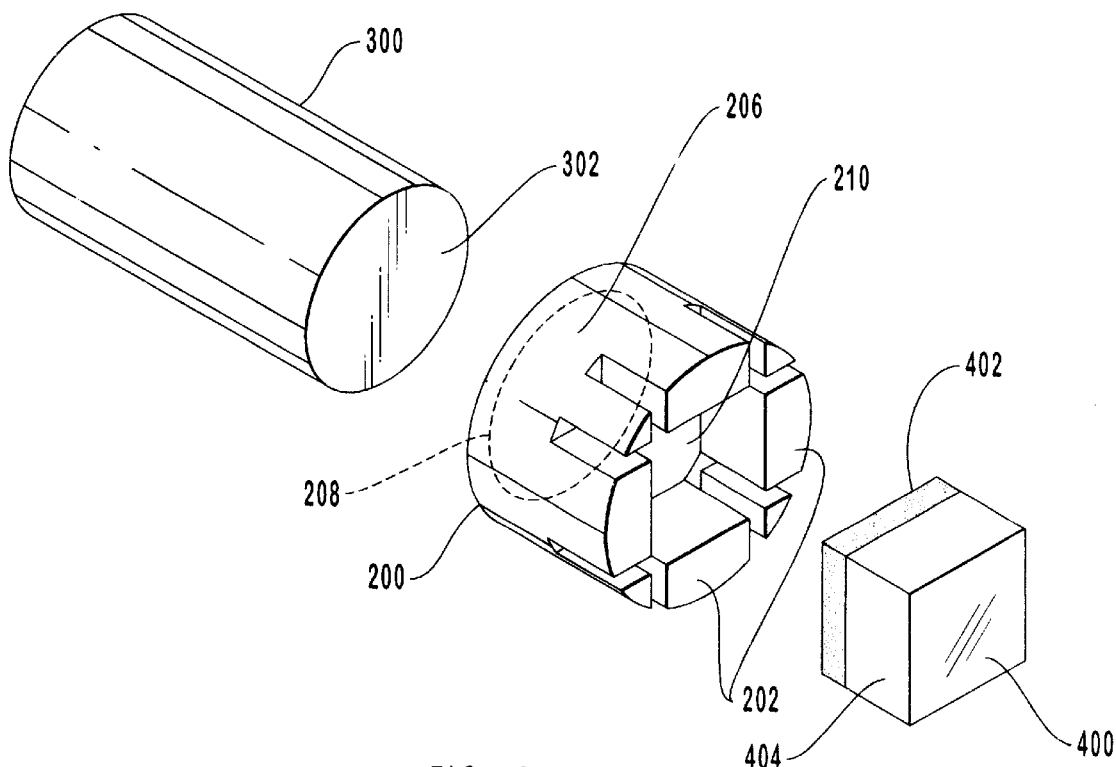
FIG. 2 is an exploded view showing the bonding collar, GRIN lens, and thin film interference filter.

Reference is first made to FIGS. 1 and 2 which depict one presently preferred embodiment of an optical assembly generally indicated at 100 and comprising a bonding incollar 200, a GRIN lens 300 and a filter 400. In the illustrated embodiment, the GRIN lens 300 and filter 400 are mounted in the bonding collar 200 and are preferably constructed of glass, plastic, or the like. In a preferred embodiment, the GRIN lens 300 is substantially circular and is about 1.8 mm in diameter, and the filter 400, having a film 402 attached thereto, is substantially cubical in shape and has a cross-sectional area of about 4 mm$^2$. As previously noted, the drawings are not drawn to scale and accordingly may not reflect these particular dimensions. While a preferred embodiment of the present invention discloses a filter 400 having a single film 402 attached thereto, the present invention also contemplates as within its scope filters 400 comprising a multi-layer thin film stack. The bonding collar 200 comprises a plurality of contact portions 202 which contact and securely hold the sides 404 of the filter 400 when the filter 400 is mounted in the bonding collar 200. In the illustrated embodiment, the contact portions 202 form visible interfaces 204 with the filter 400. In an alternative embodiment, the bonding collar 200 is used to couple two GRIN lenses 300 together. In another alternative embodiment, the bonding collar 200 is used to couple two or more GRIN lenses 300 to a filter 400. With reference to FIG. 2, and with continuing reference to FIG. 1, an exploded view of the optical assembly 100 is shown so as to better depict the component parts of the optical assembly 100. Generally, the optical assembly 100 is preferably assembled by inserting the GRIN lens 300, face 302 first, into a first socket 206 of the bonding collar 200, thus forming a visible interface 208, and by inserting a filter 400 into a second socket 210 of the bonding collar 200, thereby forming the visible interfaces 204. It will be appreciated that alternative assembly sequences could also be used.

Figure 3:
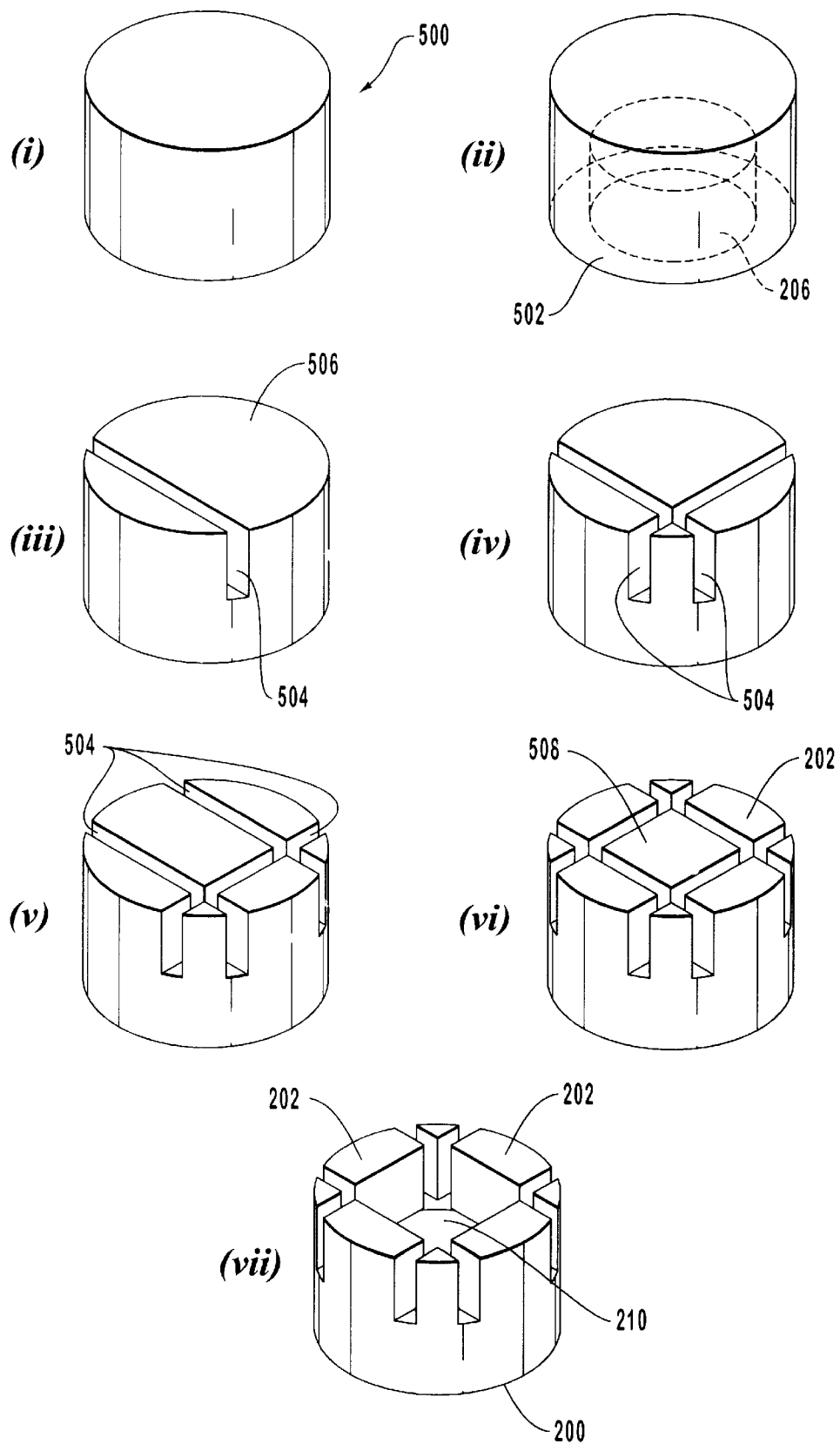
FIG. 3 is a perspective view depicting the steps taken in manufacturing a preferred embodiment of the bonding collar.

A preferred embodiment of a method for manufacturing the bonding collar 200 is shown in FIG. 3. The illustrated method begins with a blank 500 having substantially parallel ends. In a preferred embodiment, the blank 500 is substantially cylindrical, but this invention also contemplates blanks of square, polygonal and other cross-sections as well. A first socket 206 is drilled in a first end 502 of the blank 500. Next, a plurality of slots 504 are cut in the second end 506 of the blank 500. Each of the slots 504 are deep enough to intersect the first socket 206, and the slots 504 are formed to be generally perpendicular to the second end 506 of the blank 500. When the last slot 504 is cut, the waste center portion 508 drops out so as to form a second socket 210 in communication with the first socket 206.

In an alternative embodiment, the slots 504 are cut first, and then the first socket 206 is drilled to a predetermined depth, but at least deep enough to form a second socket 210 in communication with the first socket 206.

The bonding collar 200 may be manufactured from a variety of materials, including, but not limited to, 17-4 PH SS, 303 SS, 416 SS, 6061 aluminum, C14500 copper, C48500 brass, and 404 Monel™ or other nickel-copper alloys, titanium alloys, nickel-titanium alloys, and the like. Metals such as titanium alloys and nickel-titanium alloys are particularly desirable because, after heating, they tend to shrink permanently. As a result of the shrinkage thus induced, bonding collar 200 can exert compressive forces on components received in first socket 206 and second socket 210, so as to securely retain those components therein. Finally, the bonding collar 200 may also be composed of ceramic materials or the like.

In a preferred embodiment, the material of the bonding collar 200 has a thermal expansion rate about 1.7 times greater than that of the GRIN lens 300 or filter 400. As discussed in greater detail below, the performance of the optical assembly 100 can desirably be varied or 'tuned' by selecting bonding collar 200 materials having different thermal expansion characteristics. For example, a bonding collar 200 having a relatively greater, or lesser, coefficient of thermal expansion than the GRIN lens 300 or filter 400 will cause a corresponding characteristic CWL shift in the filter passband; either a positive or negative CWL shift may be thus selected.

Figure 4A:
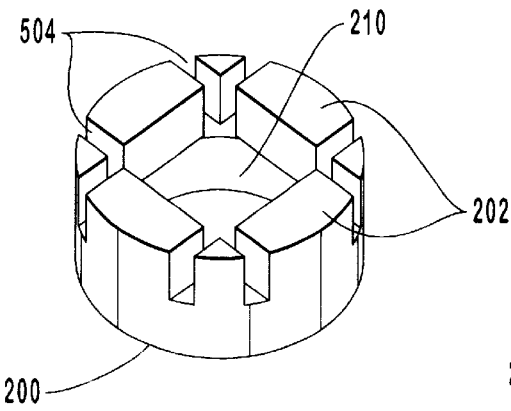
FIG. 4a is a perspective view of a preferred embodiment of the bonding collar, showing the end of the bonding collar in which the thin film interference filter is received.
Figure 4B:
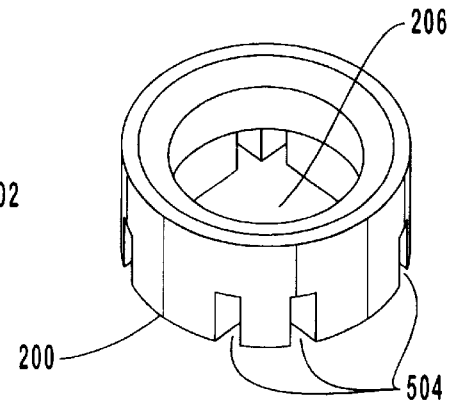
FIG. 4b is a perspective view of a preferred embodiment of the bonding collar, showing the end of the bonding collar in which the GRIN lens is received.

The bonding collar 200 has a variety of desirable features and characteristics including, but not limited to, those enumerated herein. One important feature of the bonding collar 200 is that GRIN lenses 300 and filters 400 of a variety of shapes can be coupled together with the bonding collar 200. Note that in a preferred embodiment, four slots 504 are cut in blank 500 so as to form a square second socket 210, as indicated in FIGS. 4a and 4b. However, this invention contemplates a second socket 210 having a variety of other shapes, including, but not limited to, polygonal and circular shapes. Like,vise, the geometry of the first socket 206 may be varied to receive a variety of shapes of GRIN lenses 300. Further, different relative sizes of GRIN lenses 300 and filters 400 may be coupled as well. For instance, the bonding collars 200 can be capable of accommodating a GRIN lens 300 relatively larger in cross-sectional area than the mating filter 400, and vice versa. Additionally, the bonding collars 200 can be configured to couple various combinations of GRIN lenses 300 and filters 400, wherein the GRIN lenses 300 and filters 400 comprise a variety of shapes and sizes. In an alternative embodiment, the bonding collar 200 may be used to couple GRIN lenses 300 and mirrors (not shown), wherein the GRIN lenses 300 and mirrors are of various shapes, sizes, and materials. Finally, bonding collar 200 may be profitably be employed to join or splice optical waveguides, such as optical fibers, together.

The arrangement, alignment, and geometry of the first socket 206 and the second socket 210 of the bonding collar 200 have other important implications as well. As suggested in FIGS. 5a and 5b, communication between the first socket 206 and the second socket 210 permits the face 302 of GRIN lens 300 to directly contact the film 402 of filter 400 when the GRIN lens 300 and filter 400 are fully received in their respective sockets in the bonding collar 200. In a preferred embodiment, the face 302 of GRIN lens 300 and the film 402 of filter 400 have a complementary planar configuration. This invention also contemplates arrangements wherein the face 302 of GRIN lens 300 and the film 402 of filter 400 have other complementary contacting configurations. Such arrangements may include, but are not limited to, reciprocal slanted contacting surfaces, a convex face 302 GRIN lens 300 coupled to a concave face film 402 of a filter 400, and a concave face 302 GRIN lens 300 coupled to a convex face film 402 of a filter 400.

In an alternative embodiment, the bonding collar 200 may be manufactured so as to separate the GRIN lens 300 and the filter 400 by a predetermined distance. In yet another alternative embodiment, the bonding collar 200 may be manufactured so as to orient the GRIN lens 300 and the filter 400 at a predetermined angle with respect to each other.

Figure 5A:
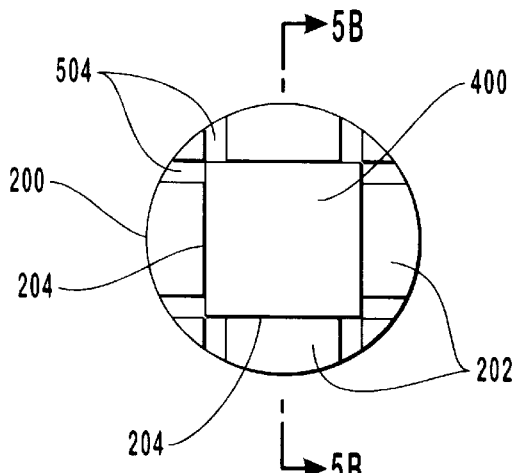
FIG. 5a depicts a preferred embodiment of the bonding collar as viewed from above the end in which the thin film interference filter is received.
Figure 5B:
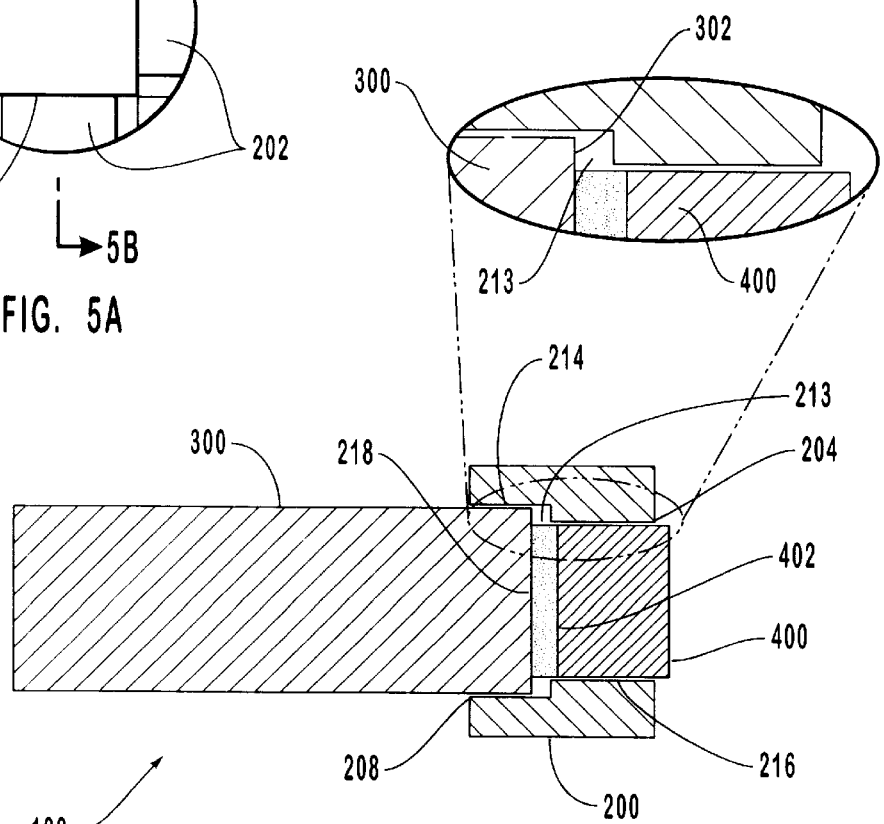
FIG. 5b is a section view, taken from FIG. 5a, which depicts the physical arrangement of the GRIN lens and thin film interference filter with respect to each other and with respect to the bonding collar.

With continuing reference to FIGS. 5a and 5b, another feature of the bonding collar 200 is that the first contact area 214, formed when GRIN lens 300 is fully received in the first socket 206 of the bonding collar 200, and the second contact area 216, formed when filter 400 is fully received in the second socket 210 of the bonding collar 200, are each separated by the space 213 that is circumjacent to the third contact area 218, i.e., the contact area formed by the contact between the face 302 of GRIN lens 300 and the film 402 of filter 400. In a preferred embodiment, the second contact area 216 comprises the aggregate of all areas wherein the filter 400 contacts the bonding collar 200. Preferably, the second contact area 216 is punctuated at regular intervals by breaks in contact between the filter 400 and the bonding collar 200 so as to form a plurality of visible interfaces 204 between the bonding collar 200 and the filter 400.

Note that this invention contemplates as within its scope any structure an/or method that would result in formation of a cavity having the functionality of space 213 as described and contemplated herein. Such structure and methods may include, but are not limited to, modification of GRIN lens 300, filter 400, and/or bonding collar 200. In one such alternative method, a circumferential portion of filter 400 may be removed so as to cause space 213 to be defined.

At least one important consequence of the relationship between the first contact area 214, the second contact area 216, and the third contact area 218 is that because the third contact area 218 is noncoterminous with respect to the first contact area 214 and the second contact area 216, adhesive applied to visible interfaces 204 and 208 cannot wick into the third contact area 218 between the GRIN lens 300 and filter 400. As previously noted, performance of the optical assembly 100 is desirably enhanced by the absence of adhesive from the optical path at the third contact area 218.

In an alternative embodiment, the entire perimeter of filter 400 is in contact with the bonding collar 200, and only a portion of the perimeter of the GRIN lens 300 is in contact with the bonding collar 200. In another alternative embodiment, the bonding collar 200 is in contact with the entire perimeter of both the GRIN lens 300 and the filter 400. In yet another alternative embodiment, the bonding collar 200 contacts only a portion of the GRIN lens 300 perimeter, and the bonding collar 200 contacts only a portion of the filter 400 perimeter.

Figure 6A:
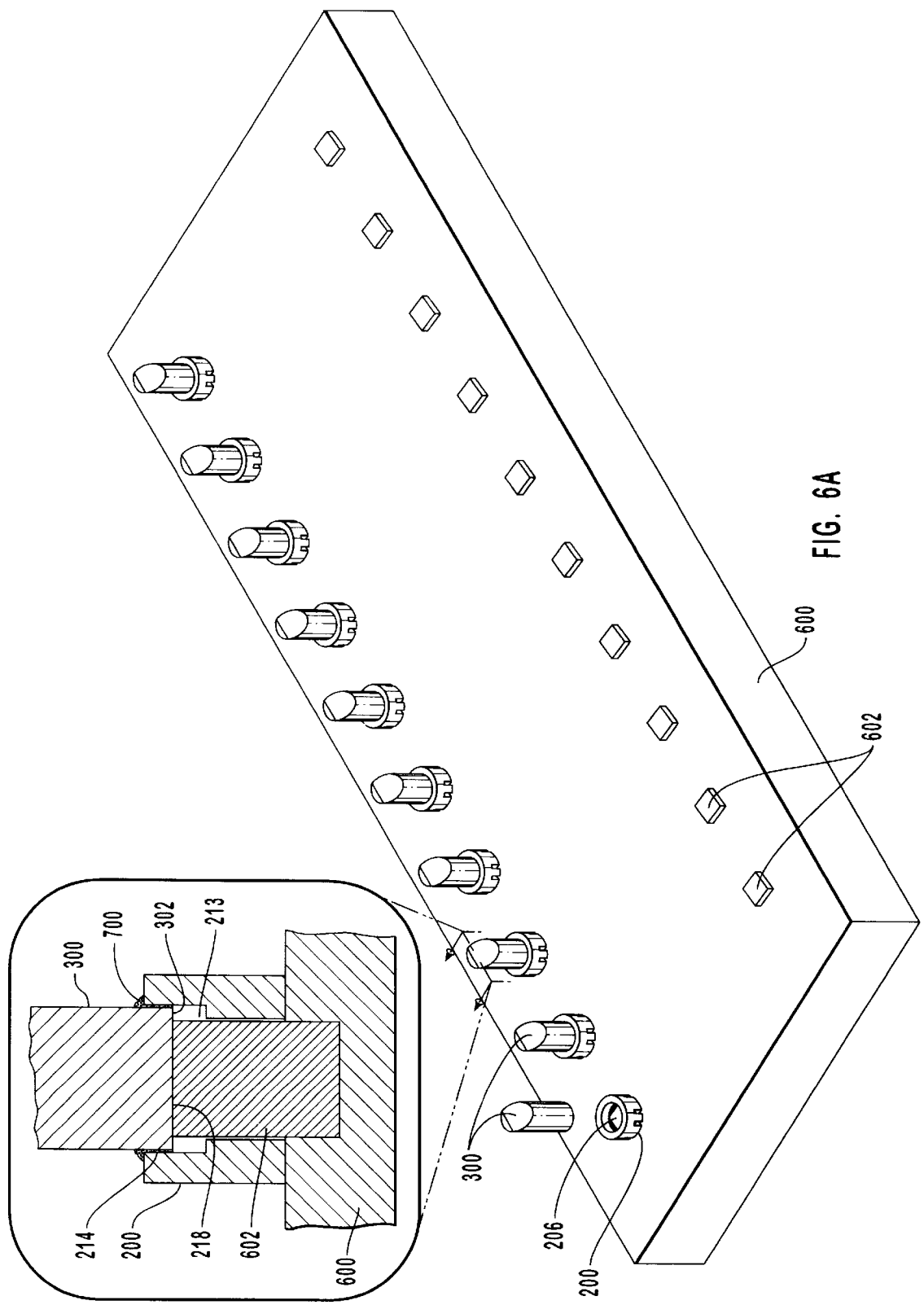
FIGS. 6a–6j depict a preferred embodiment of the method for mounting optical components to the bonding collar.

Reference is next made to FIGS. 6a through 6j, which depict one embodiment of the inventive method for mounting optical components in the inventive bonding collar 200. First, a bonding collar 200 is cleaned and placed onto a fixture 600 as indicated in FIG. 6a. In a preferred embodiment, the fixture 600 comprises a plurality of pins 602, each of which is adapted to receive the second socket 210 (not shown) of a bonding collar 200. As indicated in FIG. 6a, pin 602 acts to limit the depth to which GRIN lens 300 is inserted into bonding collar 200.

While the pins 602 are indicated as being substantially square in shape, this invention contemplates bonding collars 200 of a variety of different geometries. Consequently, the geometry of the pins 602 upon which the bonding collars 200 are seated will necessarily vary in accordance with the geometry of the bonding collar 200.

Figure 6B:
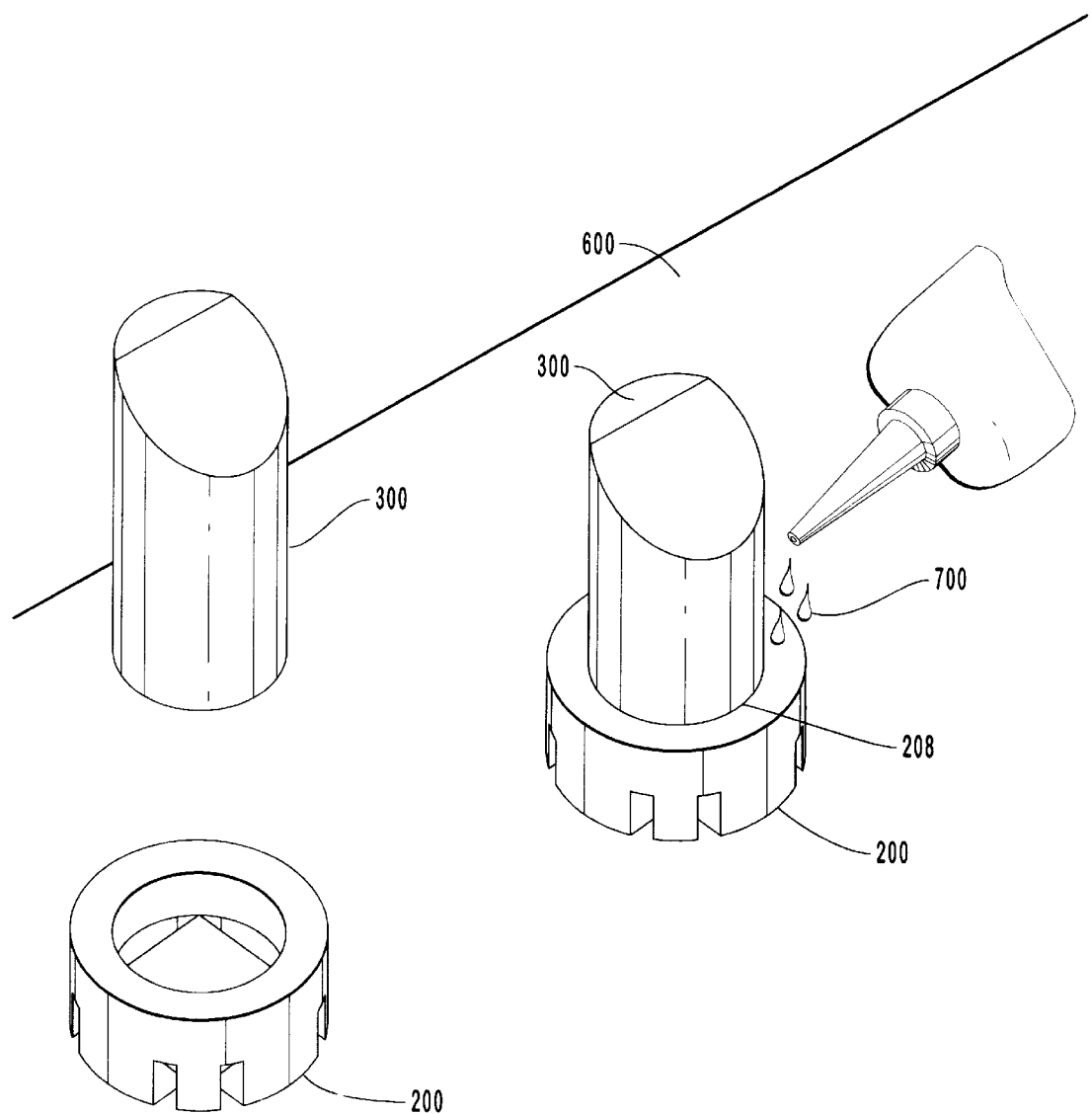

With continuing reference to FIG. 6a, a GRIN lens 300 is then cleaned and placed, face 302 down, into the upward facing first socket 206 of the bonding collar 200. With reference now to FIG. 6b, and with continuing reference to FIG. 6a, adhesive 700, preferably 3 small drops equally spaced, is then applied to the visible interface 208 between the GRIN lens 300 and the bonding collar 200, wherein the visible interface 208 defines an edge of the first contact area 214.

Note that adhesive 700 preferably comprises the following properties:

1. cure temperature at 150° C.=1 minute, and 1.5 hours at 60° C.;
2. viscosity at 23° C. @ 50 rpm,=3000–5000 cPs;
3. index of refraction=1.56;
4. spectral transmission=>95% 700–900 nm
5. lap shear strength (psi)=1500
6. Shore D hardness (cured)=87
7. Tg=>100° C. 150° C./1 hour
8. CTE below Tg/Above Tg/Above Tg (in/in/°C.)=54× $10^{-6}$/160×$10^{-6}$
9. Pot life @ room temperature =4 hours
10. Shelf life @ room temperature=1 year One such adhesive 700 comprising these properties is Epoxy Technology 353ND. However, the use of other adhesives, bonding agents, or the like, comprising similar, or other, advantageous properties are contemplated as being within the scope of the present invention.

During the bonding process wherein GRIN lens 300 is bonded to bonding collar 200, discussed in greater detail below, adhesive 700 is drawn by capillary action downward along first contact area 214. The termination of first contact area 214 at space 213 substantially reduces transportation of adhesive 700 into space 213 as adhesive 700 must overcome the increased surface tension that results from expansion of first contact area 214. This feature prevents wicking of adhesive 700 into third contact area 218.

In a preferred embodiment, the adhesive 700 has thermal expansion properties substantially similar to those of the GRIN lens 300 and the filter 400. In an alternative embodiment, solder or the like is used in place of the adhesive 700. Further, one or more of the steps of fixturing of the collars 200, insertion of the GRIN lenses 300 into the bonding collars 200, and application of the adhesive 700, is automated in a preferred embodiment.

Figure 6C:
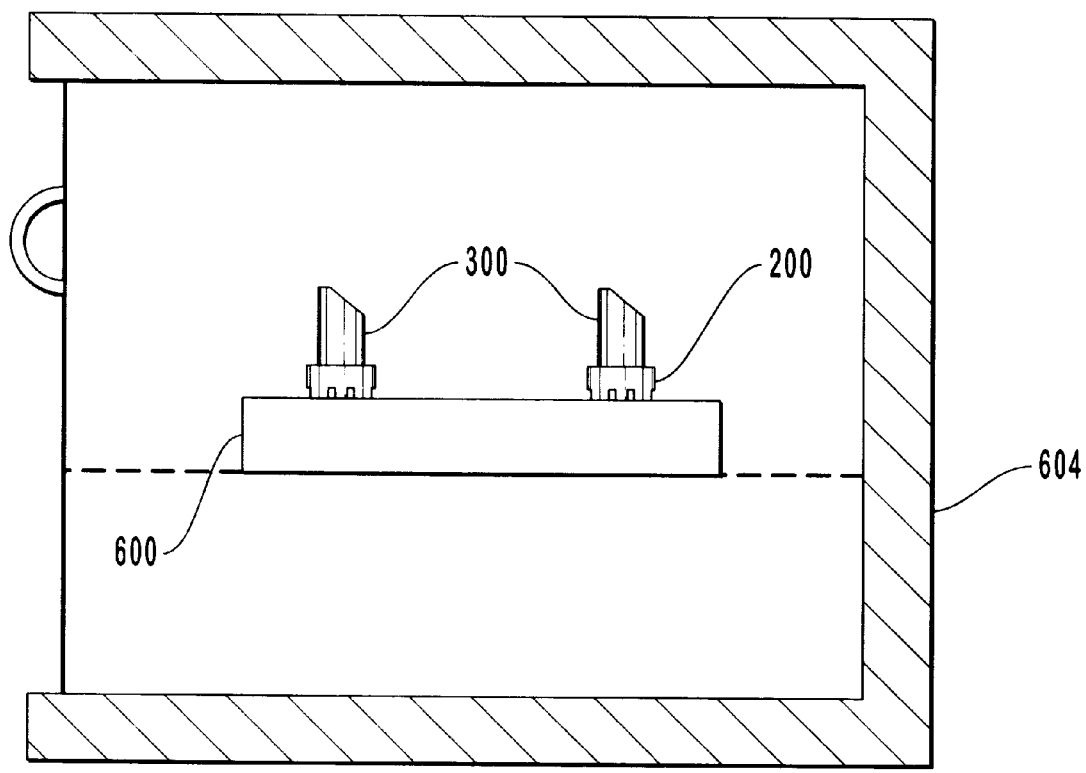

The fixture 600 holding a plurality of the GRIN lens—bonding collar subassemblies 102 thus formed is then placed in a first oven 604, as indicated in FIG. 6c, or the like so as to cure the adhesive 700. In a preferred embodiment, the adhesive 700 is cured for about 8 minutes to about 12 minutes at a temperature in the range of about 90° C. to about 110° C. After the adhesive 700 is cured, the fixture 600 is removed from the first oven 604 for cooling. Note that while this invention contemplates use of a first oven 604 for curing, any other heating means capable of curing the adhesive according to the parameters just described is contemplated as being within the scope of this invention. Further, this invention also contemplates use of adhesives or other bonding agents, which may be satisfactorily cured at room temperature, such as ultraviolet curing adhesives, aerobically curable adhesives, moisture curable adhesives, and the like.

Figure 6D:
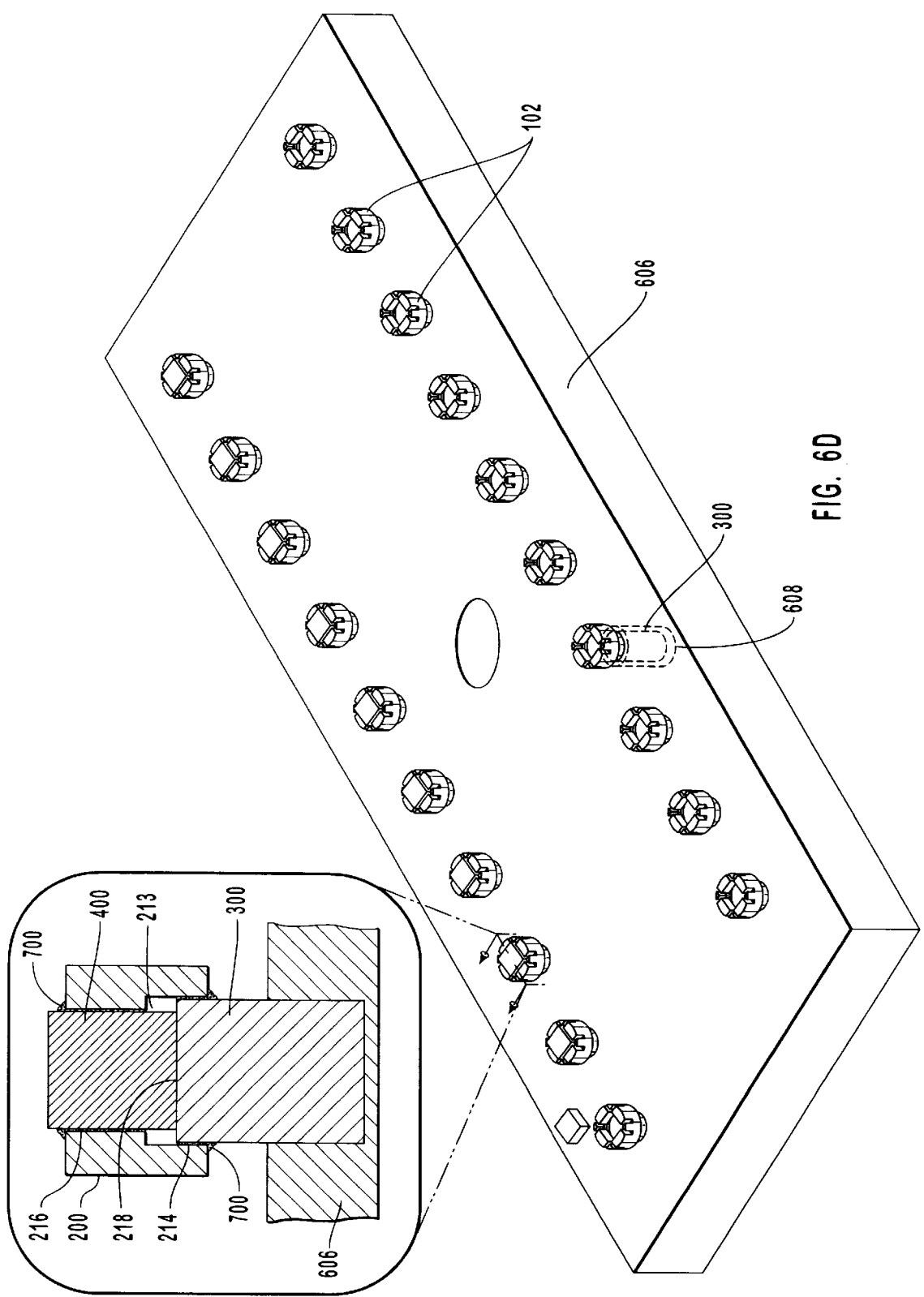
Figure 6E:
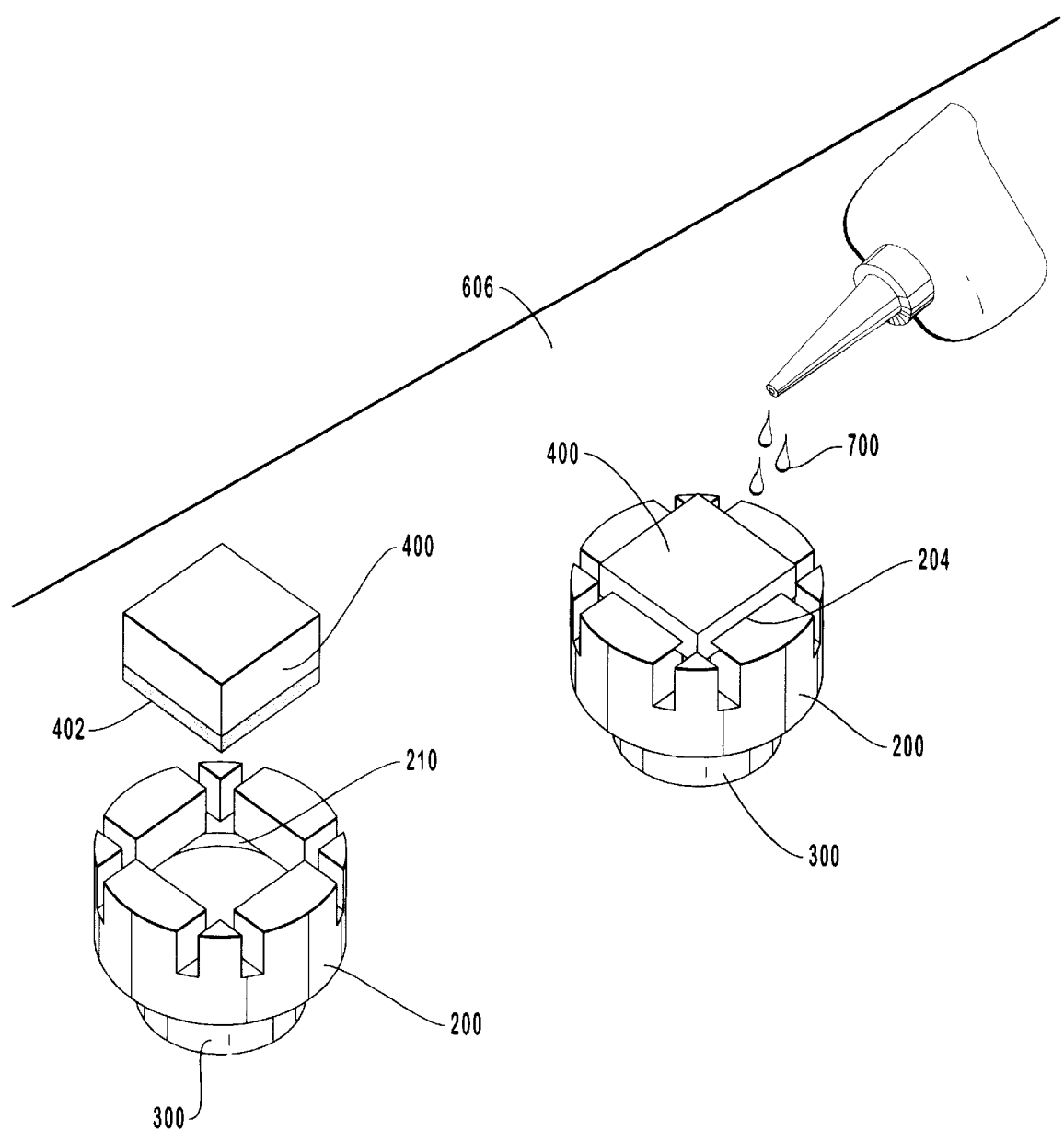

After cooling to room temperature, the GRIN lens—bonding collar subassemblies 102 are placed on a filter bonding jig 606, indicated in FIG. 6d. In a preferred embodiment, the filter bonding jig 606 comprises a plurality of receptacles 608, the receptacles 608 being slightly larger in diameter than GRIN lenses 300 so as to receive the respective GRIN lenses 300 and thus orient the respective second sockets 210 of the bonding collars 200 in an upward facing position. With reference now to FIG. 6e, and with continuing reference to FIG. 6d, a plurality of filters 400 are cleaned and then placed film 402 side down in the respective bonding collars 200. Upon insertion, filters 400 descend into bonding collar 200 until coming into face-to-face contact with the faces 302 of the respective GRIN lenses 300, thus defining second contact area 216, third contact area 218, and space 213.

Upon positioning of the GRIN lens—bonding collar subassemblies 102 on the filter bonding jig 606, adhesive 700 is then applied to the visible interfaces 204 between the filter 400 and the bonding collar 200, preferably 1 small drop of adhesive 700 at each of the visible interfaces 204, the visible interfaces 204 defining edges of the second contact area 216, as shown in FIG. 6e. As previously suggested, space 213 acts to prevent wicking of adhesive 700 into third contact area 218. In an alternative embodiment, solder or the like is used in place of the adhesive 700. In a preferred embodiment, one or more of the steps of positioning of the GRIN lens—bonding collar subassemblies 102 on the filter bonding jig 606, insertion of the filters 400 into the bonding collars 200, and application of the adhesive 700, is automated.

Figures 6F, 6G:
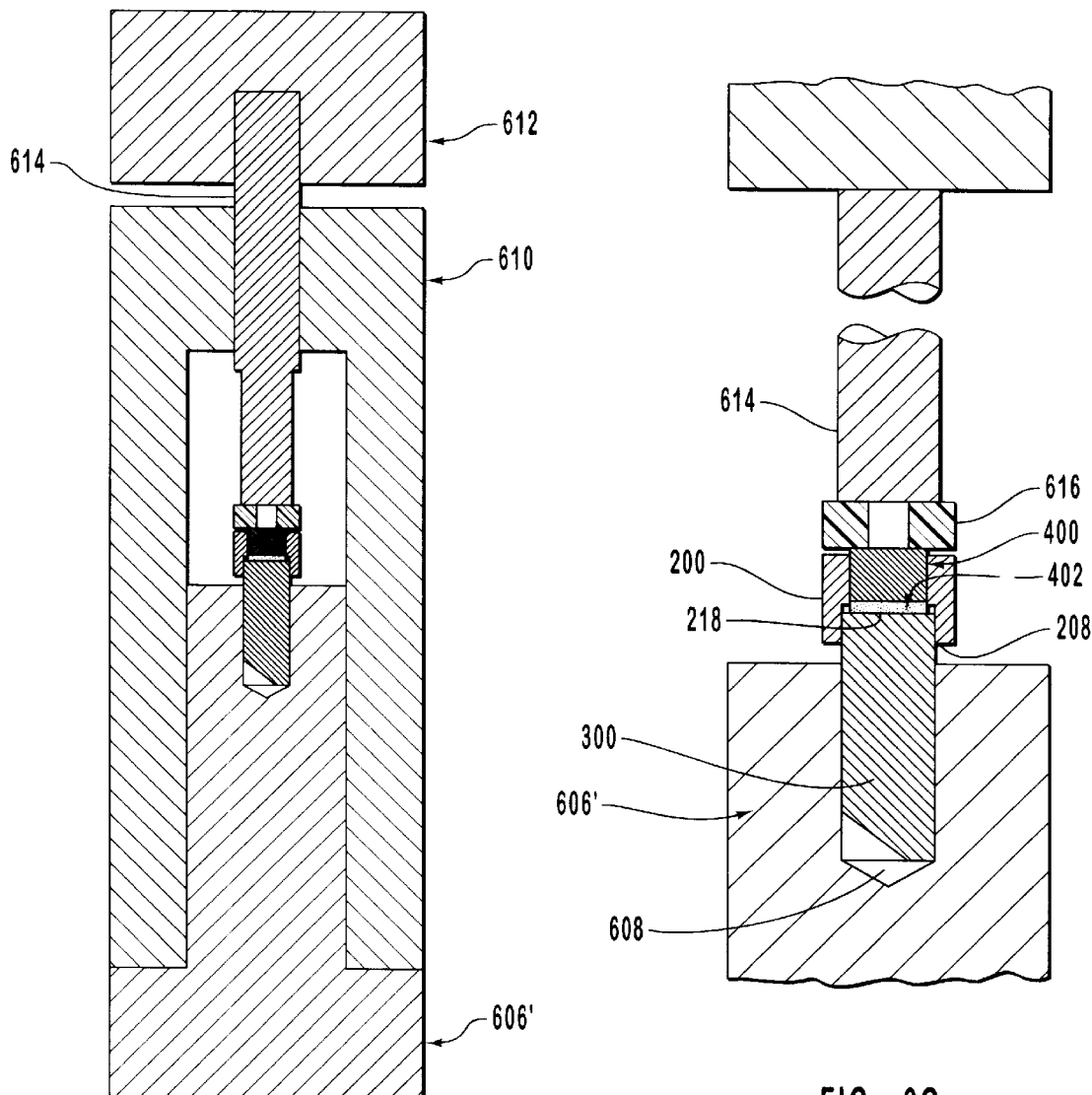

With reference now to FIGS. 6f and 6g, a weight-centering sleeve 610 is lowered over the GRIN lens— bonding collar subassembly 102. A weight 612, attached to a shaft 614 having a plastic pad 616 at one end, is then lowered into the weight centering sleeve 610 until the plastic pad 616 contacts the filter 400. The plastic pad 616 and weight 612 cooperate to hold the film 402 of filter 400 securely against the face 302 of the GRIN lens 300. In a preferred embodiment, the weight 612 is in the range of about 3 grams to about 5 grams. The filter bonding jig 606' holding the optical assembly 100 thus formed is then placed in one or more ovens, in succeeding steps, so as to cure the adhesive 700.

In an alternative embodiment, a plurality of the filter bonding jigs 606' are integrally joined together so as to collectively form a filter bonding jig (not shown) that is analogous to the filter bonding jig 606 depicted in FIG. 6d. A filter bonding jig (not shown) thus formed is thereby adapted to receive a plurality of GRIN lenses 300, the specific manner in which the GRIN lenses 300 are received being in accordance with the teachings of FIGS. 6f and 6g. Preferably, each of the filter bonding jigs 606' so joined together has associated therewith a corresponding weight centering sleeve 610, weight 612, shaft 614, and pad 616. In an alternative embodiment however, a monolithic weight of suitable size (not shown) is employed in place of a plurality of the weights 612. Also, in an alternative embodiment, the weight centering sleeves 610 are integrally joined with each other.

Figure 6H:
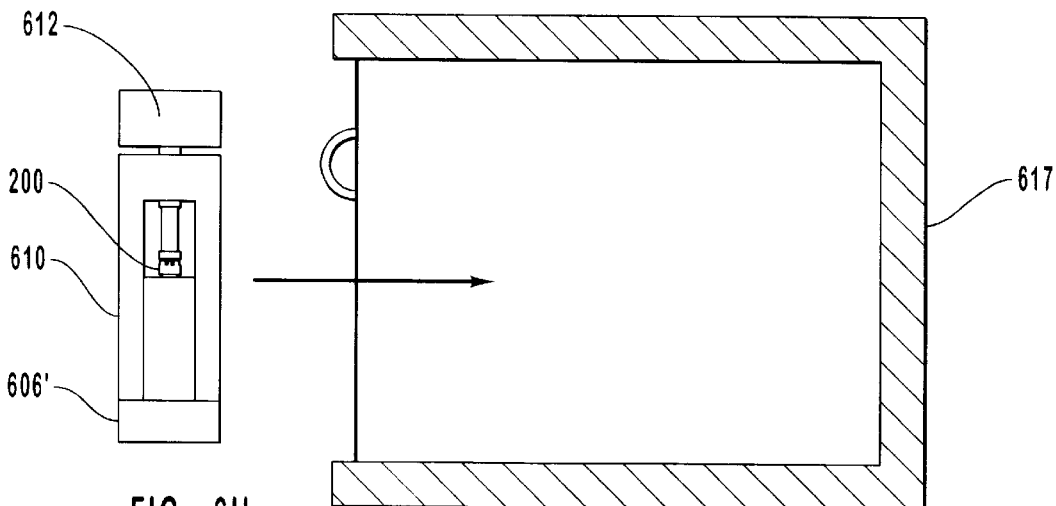

With reference now to FIG. 6h, the adhesive 700 is cured in a second oven 617 for about 10 minutes at a temperature in the range of about 90° C. to about 110° C., the weight 612 ensuring that as the bonding collar 200 expands upon exposure to the heat of the second oven 616, the face 302 of GRIN lens 300 and the film 402 of filter 400 remain in contact with each other. That is, the weight 612 prevents the expanding bonding collar 200 from pulling the film 402 of filter 400 out of contact with the face 302 of GRIN lens 300. Also, while the adhesive 700 typically has a rate of thermal expansion greater than that of the GRIN lens 300 and filter 400 (in one preferred embodiment, on the order of 5 times greater), the bonding collar 200 orientation and structure helps ensure that the disparate expansion rates do not adversely affect the alignment of the optical axis. Thus, the adhesive 700 has no appreciable effect on the positioning or alignment of the GRIN lens 300 and filter 400, relative to each other, during curing of the optical assembly 100. As previously discussed, this is a desirable result in view of the critical importance of alignment and positioning of optical components in an optical assembly.

After curing in the second oven 617, the optical assemblies 100 are then removed and allowed to cool. Upon cooling, each bonding collar 200 contracts to its pre-cure configuration, thereby applying a stress to the filter 400 in such a way that the filter 400 is slightly deformed or pulled down flat against the GRIN lens 300. This is a desirable result because prior to this initial curing, the filter 400 is curved slightly away from the GRIN lens 300 due to the influence of the film 402; flattening of the filter 400 against the GRIN lens 300 during curing increases the degree of contact between the two components, thereby improving the overall performance of the optical assembly 100.

Figure 6I:
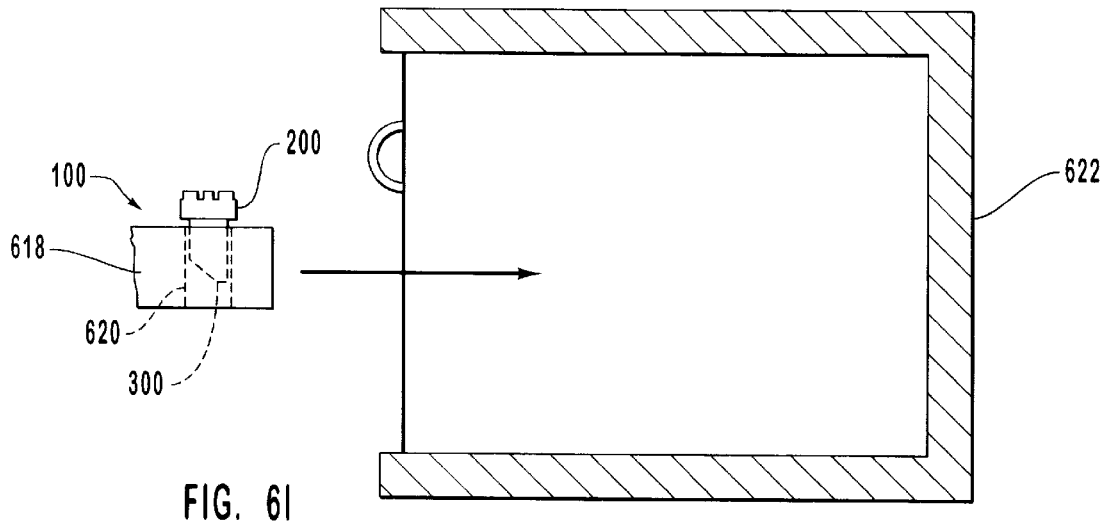
Figure 6J:
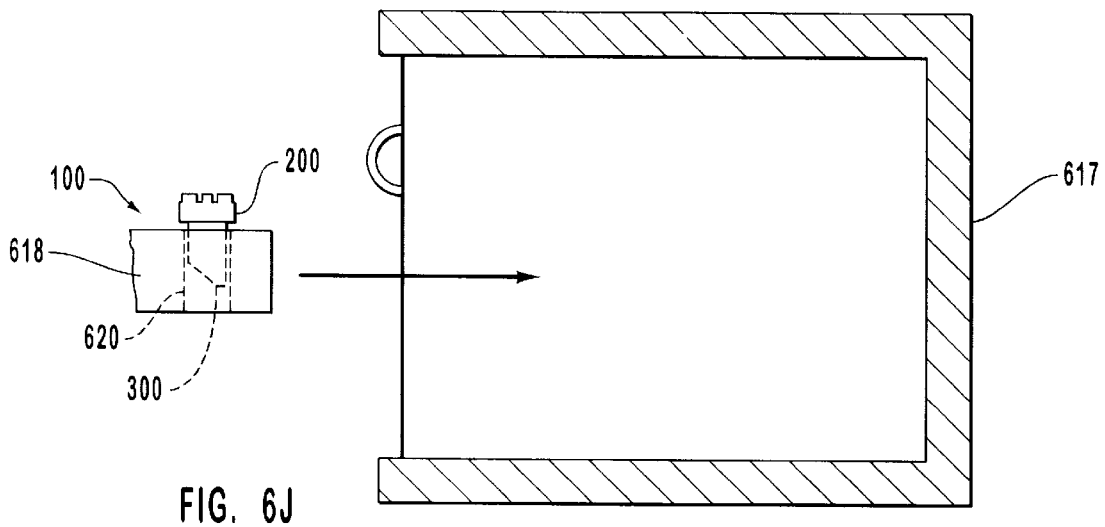

Upon cooling of the optical assemblies 100, the weight-centering sleeve 610 and weight 612 are removed from each of the optical assemblies 100. With reference now to FIG. 6i, the optical assemblies 100 are then placed in a curing fixture 618, the curing fixture 618 having a plurality of recesses 620, each recess 620 being adapted to accept an optical assembly 100. Finally, as indicated in FIG. 6j, the curing fixture 618 is then placed in a third oven 622 for further curing of the adhesive 700. In a preferred embodiment, the adhesive 700 is cured in the third oven 622 for about 1 hour at a temperature of about 65° C. to about 75° C. After curing in the third oven 622 is complete, the curing fixture 618 is removed from the third oven and replaced in the second oven 617 for final curing. In a preferred embodiment of the inventive mounting method using the bonding collar 200, the curing fixture 618 remains in the second oven 617 for about 1 hour at a temperature of about 105° C. to about 115° C. The curing fixture 618 is then removed from the second oven 617 and the completed optical assemblies 100 allowed to cool. Upon cooling, the optical assemblies 100 are ready for installation and/or use.

Setting and curing the adhesive 700 in the manner disclosed herein ensures that during operation, the bonding collar 200 continues to exert a stress on filter 400, thus improving the thermal stability of the optical assembly 100 by preventing filter 400 from changing its position or orientation with respect to GRIN lens 300. As previously noted, thermal stability is critical to optimum performance of the optical assembly 100; it has also been noted herein that thermal stability of an optical assembly 100 may be expressed in terms of CWL shift over a given range of operating temperatures. In a preferred embodiment, the absolute value of a CWL shift of an optical assembly 100 constructed in accordance with the present invention is in the range of about 0.1 pm/°C. to about 0.25 pm/°C. over an operating range of about 0° C. to about 80° C.

As suggested herein, a change in the material of the bonding collar 200 and/or in the curing temperature(s) will change the response, and thus the performance, of the optical assembly 100 when the optical assembly 100 is exposed to operating temperatures. Accordingly, this invention contemplates as within its scope desirable adjustment of the CWL shift of an optical assembly 100, i.e., an optical assembly 100 constructed in accordance with the teachings herein, by varying the composition of the bonding collar 200 and/or the curing temperature(s) of the adhesive 700.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States Letters Patent is:

1. An optical assembly, comprising:
   (a) a first optical component;
   (b) a second optical component; and
   (c) a bonding collar having at least a first socket and a second socket, said second socket being in communication with said first socket, said first optical component being received in said first socket and bonded to said first socket so as to form a first contact area, said second optical component being received in said second socket and bonded to said second socket so as to form a second contact area, said second optical component being in direct contact with said first optical component so as to form a third contact area, and said bonding collar being configured to ensure said third contact area is noncoterminous with respect to said first and second contact areas;

wherein an expansion space is provided between said first, second, and third contact areas to prevent a bonding agent from traveling from the first or second contact areas to the third contact area.

2. The optical assembly according to claim 1, wherein said first optical component comprises a gradient index lens, and wherein said second optical component comprises an interference filter having a face with a thin film uniformly deposited thereon, said thin film being in contact with a face of said gradient index lens.

3. The optical assembly according to claim 2, further comprising at least one optical waveguide, said at least one optical waveguide being at least indirectly connected to said gradient index lens.

4. The optical assembly according to claim 3, wherein said optical waveguide comprises an optical fiber.

5. The optical assembly according to claim 1, wherein said third contact area is formed by contact between a pair of complementary faces, said first optical component having one of said pair of complementary faces and said second optical component having another of said pair of said complementary faces.

6. The optical assembly according to claim 5, wherein said pair of complementary faces comprises a convex surface and a concave surface.

7. The optical assembly according to claim 5, wherein said pair of complementary faces comprises a first reciprocal slanted surface and a second reciprocal slanted surface.

8. The optical assembly according to claim 1, wherein said bonding collar has a rate of thermal expansion greater than a rate of thermal expansion of said first optical component, and said rate of thermal expansion of said bonding collar being greater than a rate of thermal expansion of said second optical component.

9. The optical assembly according to claim 8, wherein said rate of thermal expansion of said first optical component is substantially equal to said rate of thermal expansion of said second optical component, and said rate of thermal expansion of said bonding collar is in the range of about 1.5 to about 1.9 times greater than said rate of thermal expansion of said first and second optical components.

10. The optical assembly according to claim 1, wherein the second optical component extends into the first socket into contact with the first optical component, whereby the expansion space is defined between the first optical component and the second socket.

11. The optical assembly according to claim 1, wherein said first optical component comprises a gradient index lens, and wherein said second optical component comprises a mirror.

12. The optical assembly according to claim 1, wherein said first optical component comprises a first gradient index lens and said second optical component comprises a second gradient index lens.

13. The optical assembly according to claim 1, wherein said first and second optical components remain in substantial contact with each other upon exposure of the optical assembly to operating temperatures in a range of about 0° C. to about 80° C.

14. An optical assembly, comprising:
(a) at least one optical waveguide;
(b) at least one gradient index lens, said gradient index lens being at least indirectly connected to said optical waveguide;
(c) at least one thin film interference filter; and
(d) a means for maintaining said at least one gradient index lens and said at least one thin film interference filter in a pre-determined arrangement when said optical assembly is exposed to a pre-determined range of operating temperatures, so as to restrict the absolute value of a center wavelength shift of an interference filter passband to a desired range of variation.

15. The optical assembly according to claim 14, wherein said pre-determined arrangement comprises direct contact between a face of said gradient index lens and a film of said thin film interference filter.

16. The optical assembly according to claim 15, wherein said pre-determined range of operating temperatures comprises the range of about 0° C. to about 80° C.

17. The optical assembly according to claim 15, wherein said desired range of variation comprises the range of about 0.1 pm/°C. to about 0.25 pm/°C.

18. The optical assembly according to claim 15, wherein said desired range of variation comprises the range of less than about 0.25 pm/° C.

19. The optical assembly according to claim 14, wherein said means comprises a bonding collar, said bonding collar receiving said gradient index lens so as to form a first contact area with said gradient index lens and said bonding collar receiving said thin film interference filter so as to form a second contact area with said thin film interference filter, a third contact area being formed between said gradient index lens and said thin film interference filter when said gradient index lens and said thin film interference filter are fully received in said bonding collar, and said third contact area being noncoterminous with respect to said first and second contact areas.

20. The optical assembly according to claim 19, wherein the bonding collar includes a first socket for receiving the gradient index lens, and a second socket for receiving the thin film interference filter;
wherein the thin film interference filter extends into the first socket and into contact with the gradient index lens;
whereby an expansion space is provided between the gradient index lens and the second socket for preventing a bonding agent from entering the third contact area from the first or second contact areas.

21. The optical assembly according to claim 19, wherein the bonding collar applies a compressive force to hold the gradient index lens and the thin film interference filter together.

22. The optical assembly according to claim 14, wherein said pre-determined arrangement comprises a spaced apart relationship between a face of said gradient index lens and a film of said thin film interference filter.

23. The optical assembly according to claim 14, wherein said optical waveguide comprises an optical fiber.

24. A bonding collar for coupling optical components, said bonding collar configured for receiving a first optical component so as to form a first contact area therewith and a second optical component so as to form a second contact area therewith,
wherein a third contact area is formed between said first and second optical components when said first and second optical components are fully received in said bonding collar, said third contact area being noncoterminous with respect to said first and second contact areas, and
wherein said first optical component comprises a gradient index lens and said second optical component comprises a thin film interference filter.

25. The bonding collar according to claim 24, wherein said bonding collar comprises a first socket for receiving said first optical component, and said bonding collar comprises a second socket for receiving said second optical component, said first and second sockets being in communication with each other.

26. The bonding collar according to claim 25, wherein said first socket is substantially circular and said second socket is substantially square.

27. The bonding collar according to claim 24, wherein said bonding collar imposes a predetermined stress on said thin film interference filter, said predetermined stress corresponding to a bonding collar of a selected composition.

28. The bonding collar according to claim 24, wherein said bonding collar is composed of a material selected from the group consisting essentially of stainless steel, aluminum, copper, brass, nickel-copper alloys, ceramics, titanium alloys, and nickel-titanium alloys.

29. The bonding collar according to claim 24, wherein a rate of thermal expansion of said first optical component is substantially equal to a rate of thermal expansion of said second optical component, and a rate of thermal expansion of said bonding collar is greater than about 1.5 times said rate of thermal expansion of said optical components.

30. The bonding collar according to claim 24, wherein a rate of thermal expansion of said first optical component is substantially equal to a rate of thermal expansion of said second optical component, and a rate of thermal expansion of said bonding collar is greater than about 1.5 and less than about 1.9 times said rate of thermal expansion of said optical components.

31. The bonding collar according to claim 24, wherein there is at least one visible interface between said bonding collar and said second optical component, said at least one visible interface defining at least one edge of said second contact area.

32. The bonding collar according to claim 24, wherein there are a plurality of visible interfaces between said bonding collar and said second optical component, each of said visible interfaces defining an edge of said second contact area.

33. The bonding collar according to claim 24, further comprising at least one stop, said at least one stop defining a maximum depth of insertion of at least one of said first and second optical components.

34. A bonding collar for coupling optical components, said bonding collar configured for receiving a first optical component so as to form a first contact area therewith and a second optical component so as to form a second contact area therewith,
wherein a third contact area is formed between said first and second optical components when said first and second optical components are fully received in said bonding collar, said third contact area being noncoterminous with respect to said first and second contact areas, and
wherein said bonding collar comprises a material selected from the group consisting of stainless steel, aluminum, copper, brass, nickel-copper alloys, ceramics, titanium alloys, and nickel-titanium alloys.

35. A method for coupling a first optical component with a second optical component, said method comprising the steps of:
(a) forming a first contact area between a bonding collar and said first optical component, and forming a second contact area between said bonding collar and said second optical component;
(b) forming a third contact area between said first and second optical components, said third contact area being noncoterminous with respect to said first and second contact areas; and
(c) bonding said first optical component to said bonding collar at said first contact area, and bonding said second optical component to said bonding collar at said second contact area, wherein an expansion space is provided between said first, second, and third contact areas for preventing a bonding agent from traveling from the first or second contact areas to the contact area.

36. The method according to claim 35, wherein said bonding of said second optical component to said bonding collar comprises the steps of:
(a) applying adhesive to at least one visible interface between said second optical component and said bonding collar, said at least one visible interface defining an edge of said second contact area; and
(b) curing said adhesive.

37. The method according to claim 36, wherein said adhesive is cured by exposing said adhesive to heat on a predetermined number of discrete occasions, each of said discrete occasions being characterized by a predetermined period of time and a predetermined temperature.

38. The method according to claim 37, further comprising the step of forcibly maintaining contact between said first and second optical components during said curing.

39. The method according to claim 35, wherein said step of forming a first contact area between a bonding collar and said first optical component comprises inserting said first optical component into said bonding collar to a predetermined depth.

40. The method according to claim 39, wherein said predetermined depth is defined by inserting a pin into said bonding collar so that said pin occupies a portion thereof and thus limits insertion of said first optical component to an unoccupied portion of said bonding collar.

41. The method according to claim 39, wherein said bonding collar comprises a first socket for receiving the first optical component, and a second socket for receiving the second optical component; and
wherein the step of forming a third contact area includes inserting an end of said second optical component through the second socket into the first socket and into contact with the first optical component;
whereby said expansion space is formed between the first optical component and the second socket.

42. The method according to claim 35, wherein said bonding of said first optical component to said bonding collar comprises the steps of:
(a) applying adhesive to at least one visible interface between said first optical component and said bonding collar, said at least one visible interface defining an edge of said first contact area; and
(b) curing said adhesive at a predetermined temperature for a predetermined period of time.

43. The method according to claim 35, wherein said first optical component comprises a gradient index lens and said second optical component comprises a thin film interference filter.

44. The method according to claim 35, wherein said first and second optical components each comprise a gradient index lens.

45. The method according to claim 35, wherein said first optical component comprises a gradient index lens and said second optical component comprises a mirror.

46. A manufacturing method for controlling performance of optical assemblies, said manufacturing method comprising the steps of:
(a) connecting a first optical component to a bonding collar bonded to a second optical component, so that said first optical component is in direct contact with said second optical component;

(b) applying adhesive to at least one visible interface between said first optical component and said bonding collar;

(c) maintaining said direct contact between said first optical component and said second optical component by means of a force of predetermined magnitude; and (d) heating said adhesive at least once to at least one predetermined temperature, said force of predetermined magnitude being applied at least during said heating, wherein when the first optical component, the second optical component, and the bonding collar are exposed to operating temperatures lower than the predetermined temperature, the bonding collar exerts a compressive force to hold the first and second optical components together.

47. The manufacturing method according to claim 46, wherein said first optical component comprises a thin film interference filter.

48. The manufacturing method according to claim 47, wherein said second optical component comprises a gradient index lens.

49. The manufacturing method according to claim 46, wherein said bonding collar further comprises a means for preventing introduction of adhesive between said first and second optical components.

50. A method for attaching an interference filter to an optical element, comprising the steps of:

(a) placing a first surface of the interference filter in contact with a first surface of the optical element;

(b) applying a force to a second surface of the interference filter;

(c) fixing the interference filter to a bonding collar with an adhesive composition; and (b) fixing the optical element to said bonding collar with an adhesive composition.

51. The method according to claim 50, wherein said first surface of the interference filter comprises a multi-layered thin film stack.

52. The method according to claim 50, wherein the steps of fixing the interference filter and optical element to said bonding collar are accomplished by curing said adhesive composition at a predetermined temperature so that when the interference filter, optical element and said bonding collar are exposed to operating temperatures lower than said predetermined temperature, a differential between bonding collar coefficient of thermal expansion and adhesive composition coefficient of thermal expansion causes said bonding collar to exert a compressive force on the interference filter and the optical element.

53. The method according to claim 50, further comprising the step of removing said force from said second surface of the interference filter.

54. A method for attaching an interference filter to an optical element, comprising the steps of:

(a) placing a first surface of the interference filter in contact with a first surface of the optical element;

(b) applying a force to a second surface of the interference filter; and (c) securely fixing the interference filter and the optical element in a bonding collar by heating and then cooling said bonding collar so that said bonding collar, upon cooling, exerts a compressive force on the interference filter and the optical element.

* * * * *